(12) United States Patent
Notrica et al.

(10) Patent No.: US 12,551,253 B2
(45) Date of Patent: Feb. 17, 2026

(54) PECTUS EXCAVATUM TREATING APPARATUS

(71) Applicants: Medical Design Innovation, LLC, Phoenix, AZ (US); KLS Martin, L.P., Jacksonville, FL (US)

(72) Inventors: David M. Notrica, Phoenix, AZ (US); Carson Quigley, Jacksonville, FL (US); Grant Wilson, Jacksonville, FL (US); Daniel Grimm, Jacksonville, FL (US)

(73) Assignees: MEDICAL DESIGN INNOVATION, LLC, Phoenix, AZ (US); KLS MARTIN, L.P., Jacksonville, FL (US)

( * ) Notice: Subject to any disclaimer, the term of this patent is extended or adjusted under 35 U.S.C. 154(b) by 0 days.

(21) Appl. No.: 18/920,804

(22) Filed: Oct. 18, 2024

(65) Prior Publication Data
US 2025/0127548 A1    Apr. 24, 2025

Related U.S. Application Data

(60) Provisional application No. 63/544,720, filed on Oct. 18, 2023.

(51) Int. Cl.
*A61B 17/80* (2006.01)
*A61B 17/86* (2006.01)

(52) U.S. Cl.
CPC ...... *A61B 17/8076* (2013.01); *A61B 17/8052* (2013.01); *A61B 17/8615* (2013.01)

(58) Field of Classification Search
CPC .................................................. A61B 17/8076
See application file for complete search history.

(56) References Cited

U.S. PATENT DOCUMENTS

| | | | |
|---|---|---|---|
| 6,024,759 A * | 2/2000 | Nuss | A61B 17/68 606/237 |
| 10,758,290 B2 * | 9/2020 | Detweiler | A61B 17/8869 |
| 2004/0117016 A1 * | 6/2004 | Abramson | A61B 17/8076 606/71 |
| 2006/0058786 A1 * | 3/2006 | Kim | A61B 17/8076 606/60 |
| 2011/0251540 A1 * | 10/2011 | Notrica | A61B 17/8076 602/19 |
| 2017/0156759 A1 * | 6/2017 | Park | A61B 17/8866 |
| 2018/0310973 A1 * | 11/2018 | Son | A61B 17/8076 |
| 2019/0059964 A1 * | 2/2019 | Notrica | A61B 17/8863 |
| 2021/0022782 A1 * | 1/2021 | Martinez Ferro | A61B 17/808 |
| 2024/0299070 A1 * | 9/2024 | Teston | A61B 17/8076 |

\* cited by examiner

*Primary Examiner* — David W Bates
(74) *Attorney, Agent, or Firm* — Thomas C. Saitta

(57) ABSTRACT

A pectus excavatum treating apparatus or assembly having two pectus bars joined by a connecting member.

2 Claims, 3 Drawing Sheets

PECTUS EXCAVATUM TREATING APPARATUS

BACKGROUND OF THE INVENTION

This invention relates generally to the surgical treatment of pectus excavatum, and more particularly to apparatuses comprising a pair of pectus bars or stabilizers joined in a fixed relation by a connecting member.

Pectus excavatum, also known as concave or funnel chest, is a malformation or deformity of the sternum and ribs, resulting in a depression in the chest. In severe cases surgery is required, wherein one or more curved pectus bars conforming to the desired configuration of the chest cavity after treatment are inserted beneath the sternum to provide forward pressure on the sternum. In cases where two pectus bars are utilized, the bars are joined near or adjacent their ends by a connecting or bridge member to prevent relative movement of the bars during breathing or physical motion.

It is an object of this invention to provide an improved structure for the connecting member.

SUMMARY OF THE INVENTION

Figure 1:
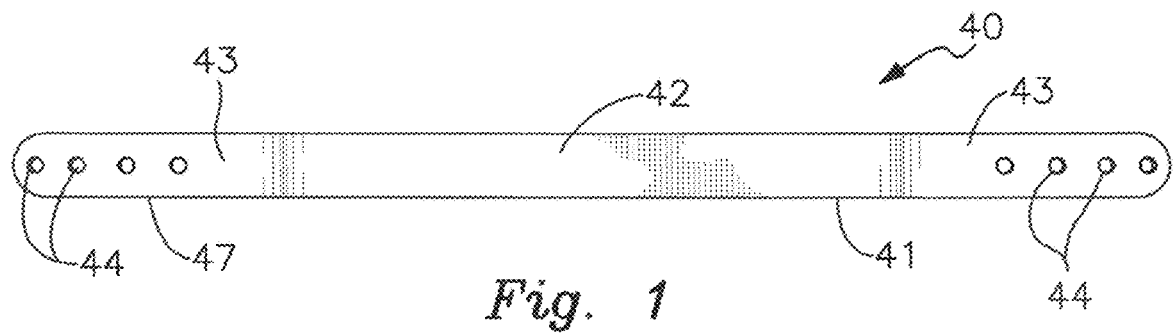
FIGS. 1 and 2 illustrate an exemplary pectus bar.
Figure 2:
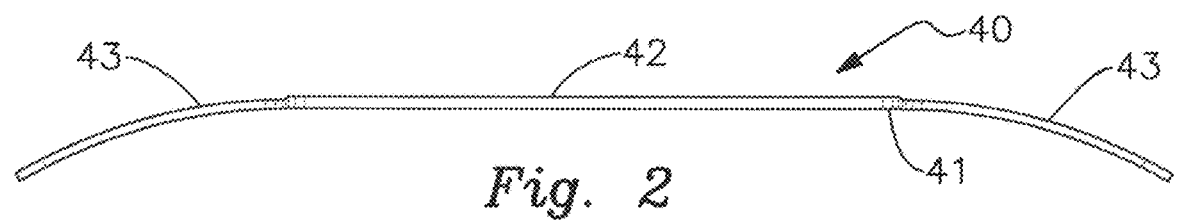
Figure 3:
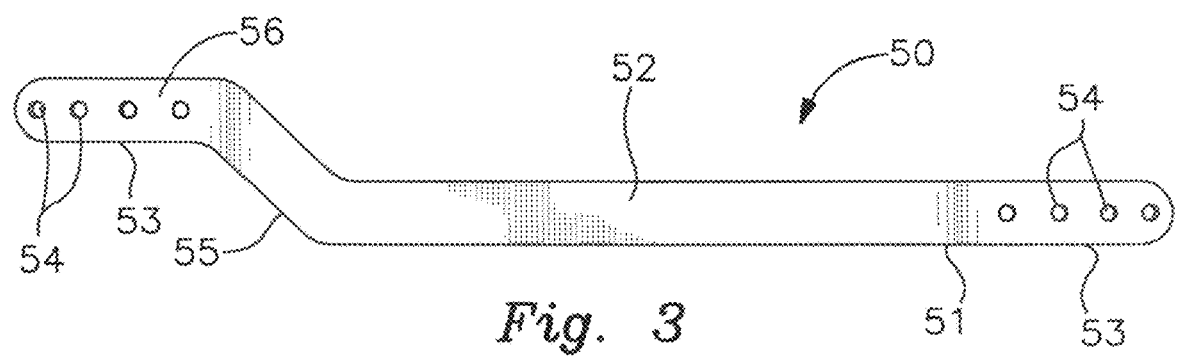
FIGS. 3 and 4 illustrate an alternative embodiment of an exemplary pectus bar.
Figure 4:
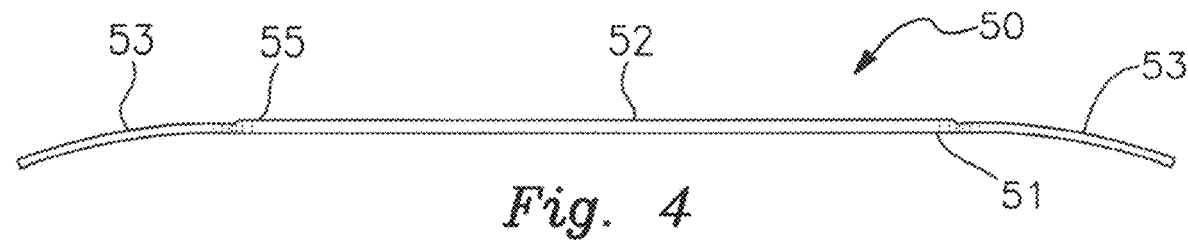

The invention in general is a pectus bar apparatus comprising an assembly or combination of two pectus bars and a connecting member. Each pectus bar comprises an elongated main body having a central section and two curved end sections, the curved end sections being offset in the posterior direction. At least one of the pectus bars will also comprise a transition section joining one of the curved end sections to the central section, the transition section defining an abutment section whereby with the pectus bars disposed within the chest cavity, the edge of the abutment section will abut the edge of one of the curved end sections of the other pectus bar, such that a connecting member can be secured transversely onto the pectus bars to preclude relative movement. The pectus bars are provided with internally threaded, fixation screw receiving apertures.

The connecting member comprises an elongated base or main body having a pair of slots, the slots being aligned linearly. Each slot is configured with a pair of opposing parallel linear walls, a semi-circular end and a partially circular end extending greater than 180 degrees, the radius of the semi-circular end being less than the radius of the partially circular end. An abutment recess is provided on the anterior side of the main body surrounding each slot, the abutment recess having a pair of opposing parallel linear walls and two semi-circular ends. The abutment recesses are wider and longer than the slots, such that a retention shoulder is defined and disposed around each slot.

A fixation screw is provided for each slot, the fixation screw having an annular head, a shaft and a threaded portion. The diameter of the threaded portion is small enough to pass through the partially circular end of the slot but large enough to prevent removal of the fixation screw once the shaft of the screw is shifted into the area between the linear opposing walls of the slot. The diameter of the shaft is small enough to pass through the area between the linear opposing walls of the slot. The diameter of the head is small enough to fit into the abutment recess but large enough to be precluded from passing through the slot by the retention shoulder.

With the screw inserted through the slot and shifted toward the outer end of the connecting member, a plug member is affixed within the semi-circular end of the abutment recess and partially circular end of the slot. The plug member may be welded, bonded or otherwise secured onto the main body. The plug member thereby locks the screw into the slot such that it cannot be removed from the connecting member but can move longitudinally within the slot.

In this manner, with the pectus bars positioned such that the edge of the abutment section of one pectus bar abuts the edge of the curved end section of the other pectus bar, or the abutment section of the other pectus bar if similarly configured, the connecting member is positioned across the two bars and the fixation screws are driven into the screw receiving apertures, thereby securing the pectus bars together.

DETAILED DESCRIPTION OF THE INVENTION

With reference to the figures, the invention is shown to be a pectus bar apparatus comprising an assembly or combination of a first pectus bar 40, a second pectus bar 50 and a connecting member 10. Each pectus bar 40/50 comprises an elongated main body 41/51 having a central section 42/52 and two curved end sections 43/53, the curved end sections 43/53 being offset in the posterior direction (FIGS. 1-4). At least one of the pectus bars (shown as pectus bar 50 in FIGS. 3-4) will also comprise a transition section 55 joining one of the curved end sections 53 to the central section 52, the transition section 55 defining an abutment section 56 whereby with the pectus bars 40/50 disposed within the chest cavity of a patient, the edge 57 of the abutment section 56 will abut the edge 47 of one of the curved end sections 43 of the other pectus bar 40, such that a connecting member 10 can be secured transversely onto the pectus bars 40/50 to preclude relative movement. The pectus bars 40/50 are provided with internally threaded, fixation screw receiving apertures 44/54 to receive fixation screws 20.

Figure 5:
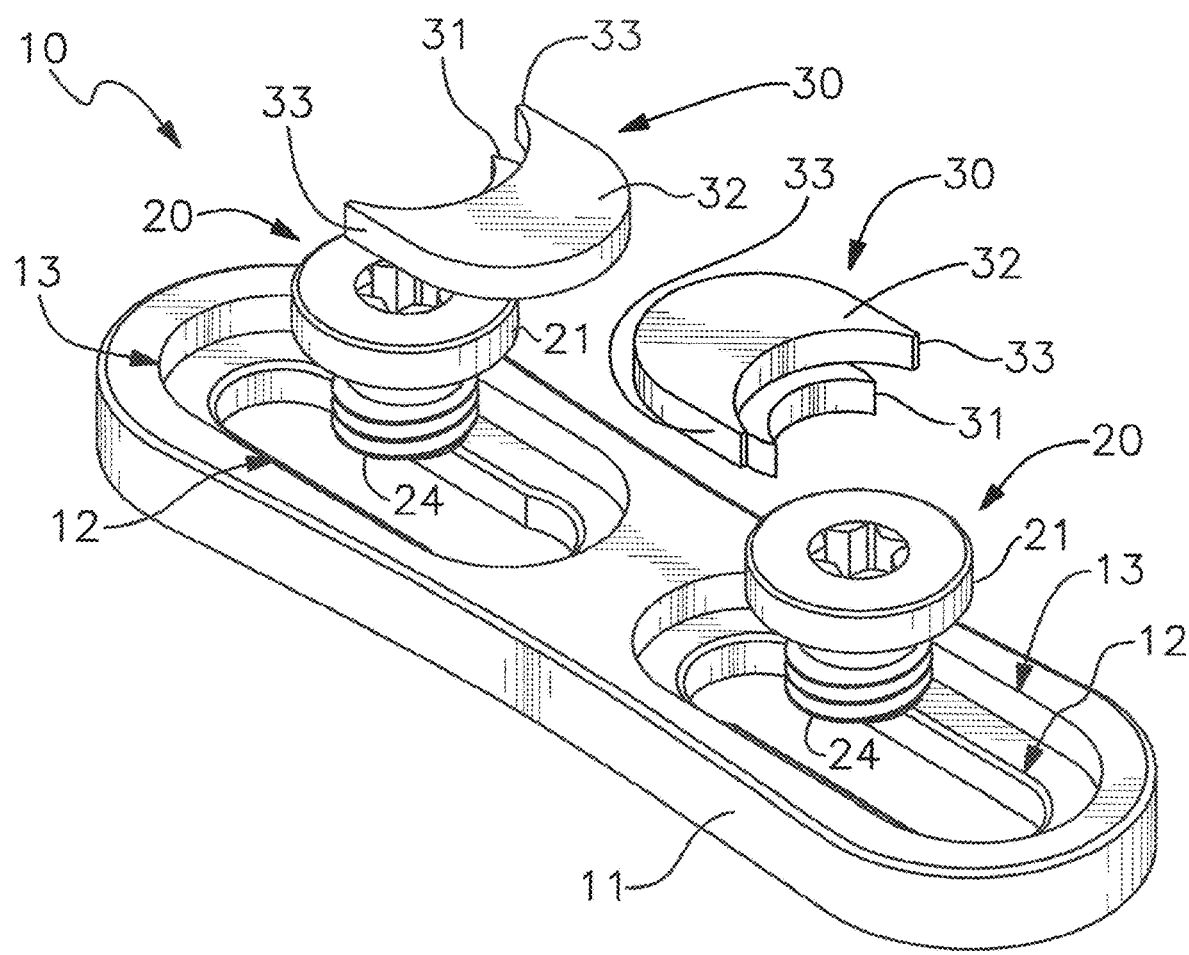
FIG. 5 is an exploded perspective view of an embodiment of the connecting member.
Figure 6:
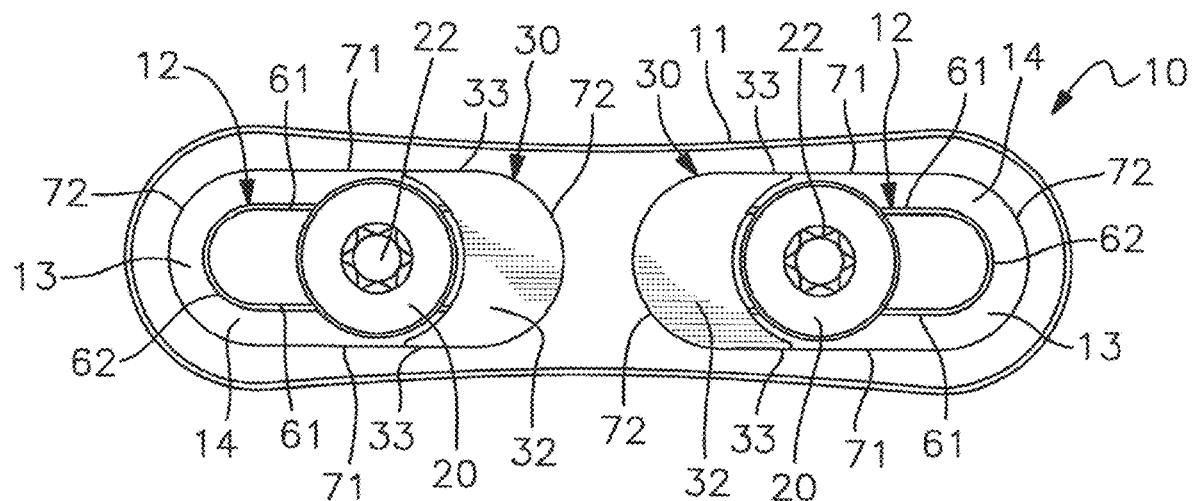
FIG. 6 is an anterior view of the connecting member of FIG. 5.
Figure 7:
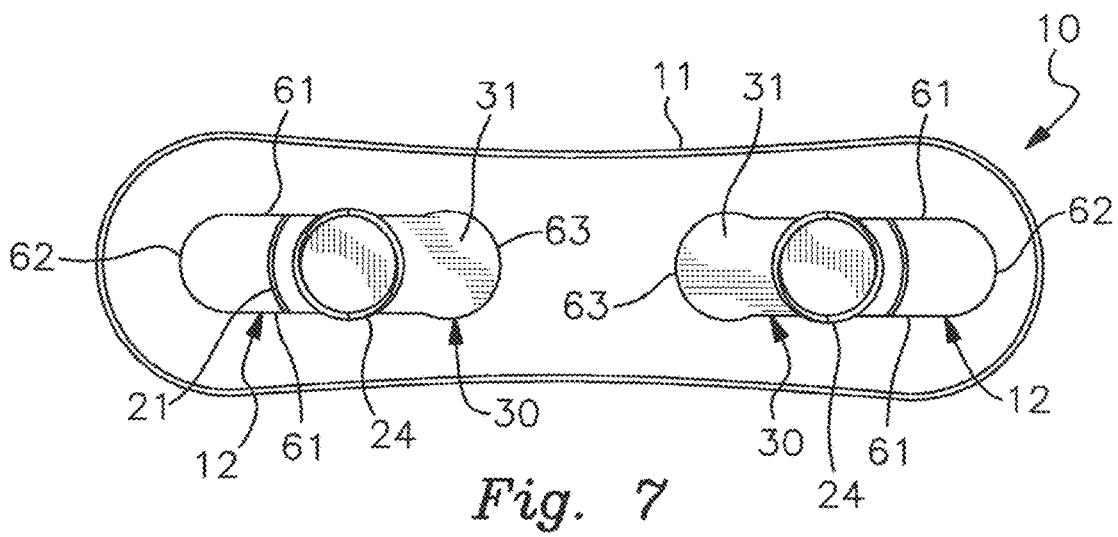
FIG. 7 is a posterior view of the connecting member of FIG. 5.
Figure 8:
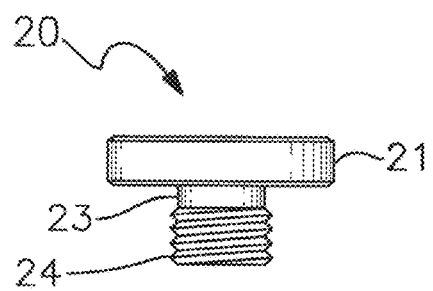
FIG. 8 illustrates a fixation member.

The connecting member 10 comprises an elongated base or main body 11 having a pair of slots 12, the slots 12 being aligned linearly (FIGS. 5-7). Each slot 12 is configured with a pair of opposing parallel linear walls 61 separated by a distance $W_2$, a semi-circular end 62, and a partially circular end 63 extending greater than 180 degrees, the radius $R_2$ of the semi-circular end 61 being less than the radius $R_3$ of the partially circular end 63 ($R_2 < R_3$), and a length $L_2$.

An abutment recess 13 is provided on the anterior side of the main body 11 surrounding each slot 12, the abutment recess 13 having a pair of opposing parallel linear walls 71 separated by a distance $W_1$, a length $L_1$, and two semi-circular ends 72 of radius $R_1$. The abutment recesses 13 are wider ($W_1 > W_2$) and longer ($L_1 > L_2$) than the slots 12, and the abutment semi-circular ends 72 are larger than the slot semi-circular ends 62 and partially circular ends 63 ($R_1 > R_2$ and $R_1 > R_3$), such that a retention shoulder 14 is defined and disposed around each slot 12.

A fixation screw 20 is provided for each slot 12, the fixation screw 20 having an annular head 21 having a radius $R_4$, a driver receiving aperture 22 such as a bore or slot, a shaft 23 having a radius $R_5$, and a threaded portion 24 having a radius $R_6$, with $R_4$ being greater than $R_6$ and $R_6$ being greater than $R_5$ ($R_4 > R_6 > R_5$). The diameter of the threaded portion 24 is small enough to pass through the partially circular end 63 of the slot 12 ($R_6 < R_3$) but large enough to prevent removal of the fixation screw 20 once the shaft 23 of the screw 20 is shifted into the area between the linear opposing walls 61 of the slot 12 ($2R_6 > W_2$). The diameter of the shaft 23 is small enough to pass through the area between the linear opposing walls 61 of the slot 12 ($2R_5 < W_2$). The diameter of the head 21 is small enough to fit into the abutment recess 13 ($2R_4 < W_1$) but large enough to be precluded from passing through the slot 12 by the retention shoulder 14 ($2R_4 > W_2$).

With the screw 20 inserted through the slot 12 and shifted toward the outer end of the connecting member 10, a plug member 30 is affixed within the semi-circular end 72 of the abutment recess 13 and partially circular end 63 of the slot 12. The plug member 30 may be welded, bonded or otherwise secured onto the main body 11. The plug member 30 thereby locks the screw 20 into the slot 12 such that it cannot be removed from the connecting member 10 but can move longitudinally within the slot 12.

A preferred embodiment of the plug member 30 is shown in FIGS. 5-7, the plug member 30 having a crescent shaped posterior portion 31 sized, configured and adapted to fit within the partially circular end 63 of the slot 12 and a crescent shaped anterior portion 32 sized, configured and adapted to fit within the abutment recess 13. The plug member posterior portion 31 preferably comprises an outer radius $R_7$ slightly smaller than the radius $R_3$ of the partially circular end 63 of the slot 12 ($R_7 < R_3$) and a concave inner radius $R_8$ slightly larger than the radius $R_5$ of the fixation screw shaft 23 ($R_8 > R_5$). The plug member anterior portion 32 preferably comprises an outer radius $R_9$ slightly smaller than the radius $R_1$ of the semi-circular ends 72 of the abutment recess 13 ($R_9 < R_1$), a pair of opposing linear portions 33 separated by a distance $W_3$ which is slightly smaller than distance $W_1$ of the abutment recess 13 ($W_3 < W_1$), and a concave inner radius of $R_{10}$ which is slightly larger than the radius $R_4$ of the fixation screw head 21 ($R_{10} > R_4$). With this structure, the concave inner radiuses of the plug member 30 will substantially correspond to the configuration the head 21 and shaft 23 of the fixation screw 20.

In this manner, with first and second pectus bars 40/50 positioned such that the edge 57 of the abutment section 56 of the first pectus bar 50 abuts the edge 47 of the curved end section 43, or another abutment section if similarly configured, of the second pectus bar 40, the connecting member 10 is positioned across the two pectus bars 40/50 and the fixation screws 20 are driven into a screw receiving apertures 44/54, thereby securing the pectus bars 40/50 together in fixed manner.

We claim:

1. A pectus excavatum treating apparatus comprising:
   a first pectus bar, a second pectus bar, a connecting member, a pair of plug members and a pair of fixation screws, the first and second pectus bars having threaded screw-retaining apertures, the connecting member and fixation screws joining the first pectus bar to the second pectus bar;
   the connecting member comprising an elongated main body having a pair of slots, each slot having a pair of opposing parallel linear walls, a partially circular end extending greater than 180 degrees and having a radius, and a semi-circular end having a radius less than the radius of the partially circular end;
   the connecting member further comprising an abutment recess surrounding each slot, the abutment recess having a pair of opposing parallel linear walls and two semi-circular ends having a radius, the abutment recesses being wider and longer than the slots, and the abutment semi-circular ends being larger than the slot semi-circular ends and partially circular ends 63, such that a retention shoulder is defined and disposed around each slot;
   the plug members comprising a crescent shaped posterior portion sized, configured and adapted to fit within the partially circular end of the slot and a crescent shaped anterior portion sized, configured and adapted to fit within the abutment recess;
   the fixation screw comprising an annular head having a radius, a driver receiving aperture, a shaft having a radius, and a threaded portion 24 having a radius, with the annular head radius being greater than threaded portion radius and the threaded portion radius being greater than shaft radius, wherein the threaded portion is sized to pass through the partially circular end of the slot but cannot pass through the linear opposing walls of the slot, wherein the shaft is sized to pass between the linear opposing walls of the slot 12 and wherein the head is sized to fit into the abutment recess is precluded from passing through the slot by the retention shoulder; and
   wherein with the fixation screws and the plug members disposed within the slots and abutment recesses of the elongated main body of the connecting member, the fixation screws cannot be removed from the elongated main body, and one fixation screw is mounted into one of the threaded screw-retaining apertures of the first pectus bar, and another fixation screw is mounted into one of the threaded screw-retaining apertures of the second pectus bar, thereby joining the first and second pectus bars in a fixed relationship.

2. A pectus excavatum treating apparatus comprising:
   a first pectus bar, a second pectus bar, a connecting member, a pair of plug members and a pair of fixation screws, the first and second pectus bars having threaded screw-retaining apertures, the connecting member and fixation screws joining the first pectus bar to the second pectus bar;
   the connecting member comprising an elongated main body having a pair of slots, the slots being aligned linearly and having a pair of opposing parallel linear walls separated by a distance $W_2$, a semi-circular end, and a partially circular end extending greater than 180 degrees, the radius $R_2$ of the semi-circular end being less than the radius $R_3$ of the partially circular end, and a length $L_2$;
   the connecting member further comprising an abutment recess on the anterior side of the main body and surrounding each slot, the abutment recess having a pair of opposing parallel linear walls separated by a distance $W_1$, a length $L_1$, and two semi-circular ends of radius $R_1$, wherein distance $W_1$ is greater than distance $W_2$ and length $L_1$ is greater than length $L_2$, and wherein the radius $R_1$ is greater than radius $R_2$ and radius $R_1$ is greater than $R_3$), such that a retention shoulder is defined and disposed around each slot;

the fixation screws comprising an annular head having a radius $R_4$, a driver receiving aperture, a shaft having a radius $R_5$, and a threaded portion having a radius $R_6$, with radius $R_4$ being greater than $R_6$ and $R_6$ being greater than $R_5$, and further wherein radius $R_6$ is greater than $R_3$, two times radius $R_6$ is greater than distance $W_2$, two times radius $R_5$ is less than distance $W_2$, two times radius $R_4$ is less than distance $W_1$, and two times radius $R_4$ is greater than distance $W_2$;

the plug member comprising a crescent shaped posterior portion sized, configured and adapted to fit within the partially circular end of the slot and a crescent shaped anterior portion sized, configured and adapted to fit within the abutment recess, the plug member posterior portion having an outer radius $R_7$ smaller than the radius $R_3$ and a concave inner radius $R_8$ slightly larger than the radius $R_5$, and the plug member anterior portion comprising an outer radius $R_9$ smaller than the radius $R_1$, a pair of opposing linear portions separated by a distance $W_3$ which is smaller than distance $W_1$, and a concave inner radius of $R_{10}$ which is larger than the radius $R_4$;

wherein with the fixation screws and the plug members disposed within the slots and abutment recesses of the elongated main body of the connecting member, the fixation screws cannot be removed from the elongated main body, and one fixation screw is mounted into one of the threaded screw-retaining apertures of the first pectus bar, and another fixation screw is mounted into one of the threaded screw-retaining apertures of the second pectus bar, thereby joining the first and second pectus bars in a fixed relationship.

\* \* \* \* \*